(12) United States Patent
Thierman et al.

(10) Patent No.: US 8,401,816 B2
(45) Date of Patent: Mar. 19, 2013

(54) APPARATUS AND METHOD FOR GEOMETRIC MEASUREMENT

(75) Inventors: Jonathan S. Thierman, Baltimore, MD (US); Ibrahim M. Hallaj, Newton, MA (US)

(73) Assignee: Sure-Shot Medical Device Inc.

( * ) Notice: Subject to any disclaimer, the term of this patent is extended or adjusted under 35 U.S.C. 154(b) by 236 days.

(21) Appl. No.: 12/784,694

(22) Filed: May 21, 2010

(65) Prior Publication Data

US 2011/0288812 A1 Nov. 24, 2011

(51) Int. Cl.
*G06F 15/00* (2006.01)
(52) U.S. Cl. .................................................. 702/151
(58) Field of Classification Search .............. 702/151, 702/155, 159; 250/234, 235, 559.33; 235/472.01
See application file for complete search history.

(56) References Cited

U.S. PATENT DOCUMENTS

| | | | |
|---|---|---|---|
| 4,615,617 A | 10/1986 | Frank et al. | |
| 4,620,788 A | 11/1986 | Giger | |
| 5,815,251 A | 9/1998 | Ehbets et al. | |
| 5,949,531 A | 9/1999 | Ehbets et al. | |
| 6,463,393 B1 | 10/2002 | Giger | |
| 6,563,130 B2 * | 5/2003 | Dworkowski et al. | ... 250/559.33 |
| 6,727,985 B2 | 4/2004 | Giger | |
| 6,802,451 B2 * | 10/2004 | Yavid et al. | .............. 235/472.01 |
| 6,859,744 B2 | 2/2005 | Giger | |
| 6,864,966 B2 | 3/2005 | Giger | |
| 7,030,969 B2 | 4/2006 | Giger | |
| D607,353 S | 1/2010 | Hackenberg | |
| 2009/0142002 A1 * | 6/2009 | Middendorf | .................. 382/286 |

FOREIGN PATENT DOCUMENTS

| | | |
|---|---|---|
| WO | WO94/27164 | 11/1994 |
| WO | WO98/18019 | 4/1998 |
| WO | WO02/16964 | 8/2001 |
| WO | WO02/44754 | 11/2001 |

* cited by examiner

*Primary Examiner* — Bryan Bui
(74) *Attorney, Agent, or Firm* — Intrinsic Law Corp; Ibrahim M. Hallaj

(57) ABSTRACT

An non-contacting measurement apparatus for measuring distances, angles and related geometric quantities, and for computing other quantities based on the measurements, is provided. A visible light beam allows a user to point the device at one or more points to which the distance is measured, and angular rotation between the various points of interest can be recorded. Then, geometric and trigonometric relationships are used to compute and display lengths, areas, volumes or other facts derived from the measurements. Various input and output features are provided in the present embodiments.

32 Claims, 6 Drawing Sheets

APPARATUS AND METHOD FOR GEOMETRIC MEASUREMENT

TECHNICAL FIELD

The present application relates to measuring distances, areas and volumes in space, including those with irregular shaped dimensions, using a light source and sensor such as a laser light source and sensor.

BACKGROUND

Distances can be measured using standard measuring contraptions such as yard sticks, rulers, and so on. These devices generally measure linear distances representing a distance between a first point and a second point in Euclidean space (e.g., in a plane) along a straight line. The linear distances are considered to be the shortest distances between two points, and have generally been used since antiquity.

Other techniques have been in existence for some time include flexible tape measures and wheel-based rolling measures that allow the distance along a non-linear (e.g., curved) path to be measured. These things are useful for measuring a circumference of a curved surface or the distance along a winding perimeter, path, and so on.

Generally speaking, all of the above measuring devices require the user carrying out the measurement to physically position the devices, or ends thereof at two or more locations along the object being measured. For example, to measure the length of an object with a ruler, a person holds the ruler against the object and reads off the measurement increments to obtain the length reading. And to use a flexible tape measure, the user holds the tape against the surface being measured and reads off the units of measurement.

These devices above are not conducive to measuring the length of an object in an inaccessible location. For example, if a person standing on the ground wishes to measure the length of a beam along an elevated ceiling of a building, the person would typically climb up to the ceiling on a ladder to place a ruler or tape measure against the beam to measure its length. This can be inconvenient, dangerous, or not possible.

Some distance measurement devices have been developed recently that do not require physical contact or proximal placement against the objects being measured. For example, commercially available "laser distance measuring" devices or "laser range finder" products can be used from a position remote to the object being measured. These products deliver a beam of laser light which is projected out from a hand-held apparatus, impinging upon the object whose distance is to be measured, and displaying to the user a distance from the apparatus to the object upon which the laser light is being shone.

It has not been possible or practical so far to make measurements that a user can conduct at a distance from the object being measured conveniently and accurately, especially if the measurements are along irregular or non-linear paths.

SUMMARY

In some embodiments, the present disclosure provides an apparatus for making measurements and computations of geometric quantities such as distances, areas and volumes. The measurements may be performed by pointing a measurement apparatus towards a plurality of points of interest in space, for example, points on an object of interest. More specifically, the measurements may be made by pointing a visible coherent light beam towards points on an object of interest or along a path so that the measurement apparatus can measure the plurality of distances to the respective points of interest and use geometric and/or trigonometric relations to compute said geometric quantities.

In some aspects, the device provides a visible (or apparent) illuminated path along which it is computing the measured geometric quantity. For example, along a straight line connecting two spatial points of interest, or the vertexes of a triangle, rectangle, or polygon of interest.

In some aspects, the device includes a user interface so that a user can actuate a button to indicate that the device is shining the coherent light beam at a point of interest and to capture a distance related to this point of interest. An encoder or sensor to capture angular rotation of the apparatus may be used to complete the information needed to determine the geometric quantities of interest.

In other aspects, a processor and memory device are incorporated in the measurement apparatus to process measurements and to store information and results relating to the same.

In still other aspects, a user interface comprising actuators like push buttons or switches or touch screen input/output devices may be included in the design to allow a user of the apparatus to input desired settings to the apparatus and to review output measurements and information from the apparatus.

In some embodiments, the apparatus scans or rapidly delivers successive point or line output light signals to certain points in space so as to give a user a visual understanding of the physical positions and extent of that being measured. For example, once a user defines a beginning and ending point on a line segment (e.g., from one end of a beam to another) the apparatus can scan one or more spots of visible laser light onto the straight line segment between the two ends of the beam.

In yet other aspects, the measurement apparatus can be coupled to another mobile device such as a cellular phone that can be plugged into a connector interface to communicate data between the mobile device and the measurement apparatus. The user interface and processor or memory of the mobile device may be used to provide data and instructions to the measurement apparatus or to receive data and results from the measurement apparatus. A docking or coupling place may be provided in the measurement apparatus for inserting the mobile device thereinto.

Furthermore, once measurements of length or area or volume are made, the apparatus may incorporate pricing data to determine the expected cost of performing some work on an object of interest associated with the measurements. For example, it can compute the cost of linear feet of fencing, molding, or square feet of wall board or paint required to paint a room, and so on. The information about the geometric quantities or pricing may then be transmitted to other computing devices over connectors coupled to the measurement apparatus or over a network.

BRIEF DESCRIPTION OF THE DRAWINGS

For a fuller understanding of the nature and advantages of the present concepts, reference is be made to the following detailed description of preferred embodiments and in connection with the accompanying drawings, in which.

DETAILED DESCRIPTION

As discussed above, it is useful to be able to measure geometric distances, areas and volumes, especially if they are inconvenient to reach by a user, and especially if one or more of their dimensions is not linear or regular in shape. A measuring apparatus that does not require laying the apparatus out against the object being measured, or a non-contacting apparatus is useful in numerous ways as will be described below.

Figure 1:
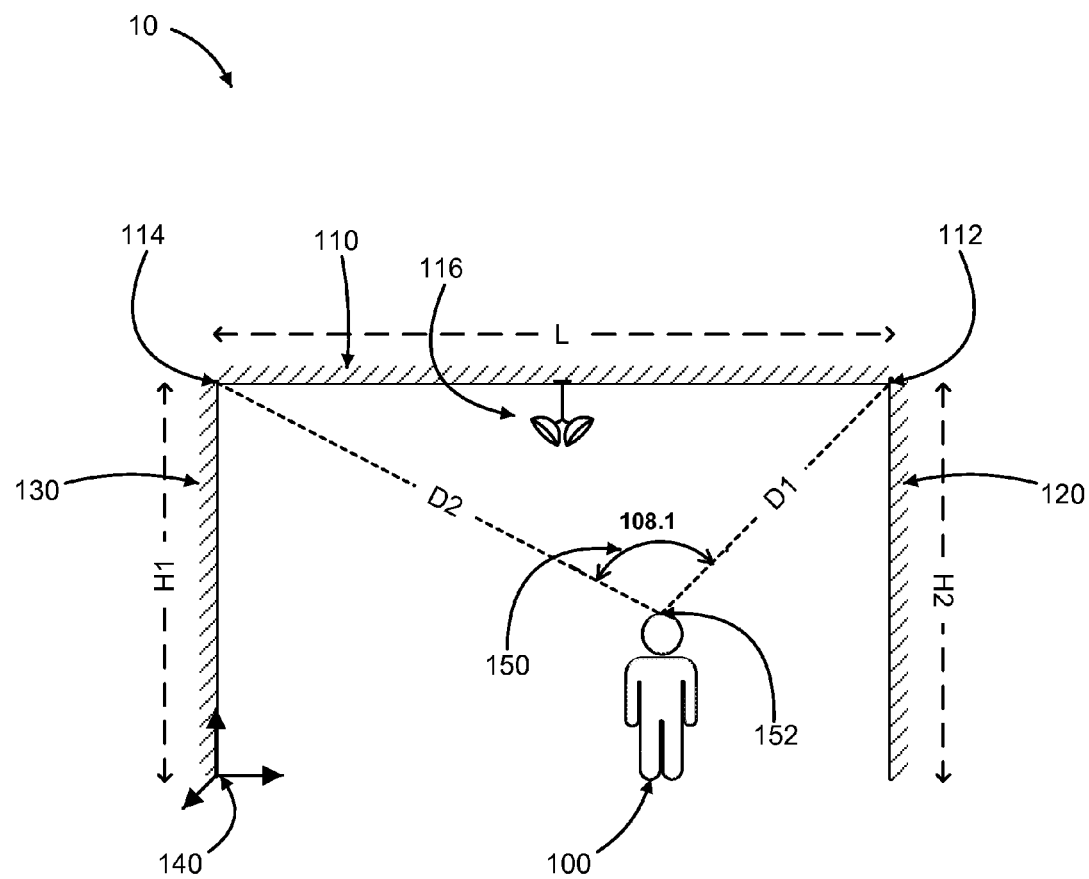
FIG. 1 illustrates a first problem for measuring the length of an elevated beam or dimension which the user cannot easily reach.

To illustrate a first problem or scenario for use of the present method and system, FIG. 1 shows a space 10 such as an interior building space (e.g., a room), whose dimensions can be defined with respect to a coordinate system or frame of reference 140. A user 100 stands within the space and wishes to determine the length L of the ceiling 110 or the room. The ceiling is elevated above user 100 and it is not safe or convenient or possible for user 100 to manually or physically reach the ceiling 110. The ceiling 110 runs between two upright walls 130 and 120 having heights H1 and H2 respectively. The length to be determined (L) runs in a substantially straight line between ceiling end points 112 and 114. Conventionally, user 100 would get up on a ladder to reach the ceiling 110 with a mechanical measuring device such as a tape measure, which is run from first point 112 to a second point 114. This is not always possible or convenient or safe, and can require a second person to assist. In addition, mechanical measuring devices can be too short or shaped in a way that is not conducive for such measurement. Furthermore, if an obstacle, e.g. another beam or light fixture 116 protrudes from the length to be measured this can complicate or prevent easy and accurate measurement of length L.

It is understood that by sufficient determination of a pair of distances D1 and D2, which have a common origin 152 (e.g., near user 100) and terminate at points 112 and 114 respectively, and the angle 150 therebetween, the length L can be calculated from basic geometric relationships of the triangle defined by trio of points (112, 114, 152).

Some products have been devised to measure a length between two points, e.g., between 152 to 112 (distance D1). Others can measure a desired object's length along a straight line, but only if the intermediate distances defining the ends of the desired object's length define an exact right angle triangle with respect to the object. Therefore, as will be further discussed below, the present method and apparatus is useful in allowing more free and flexible determination of dimensions, distances, and geometric information about the objects being measured.

Figure 2:
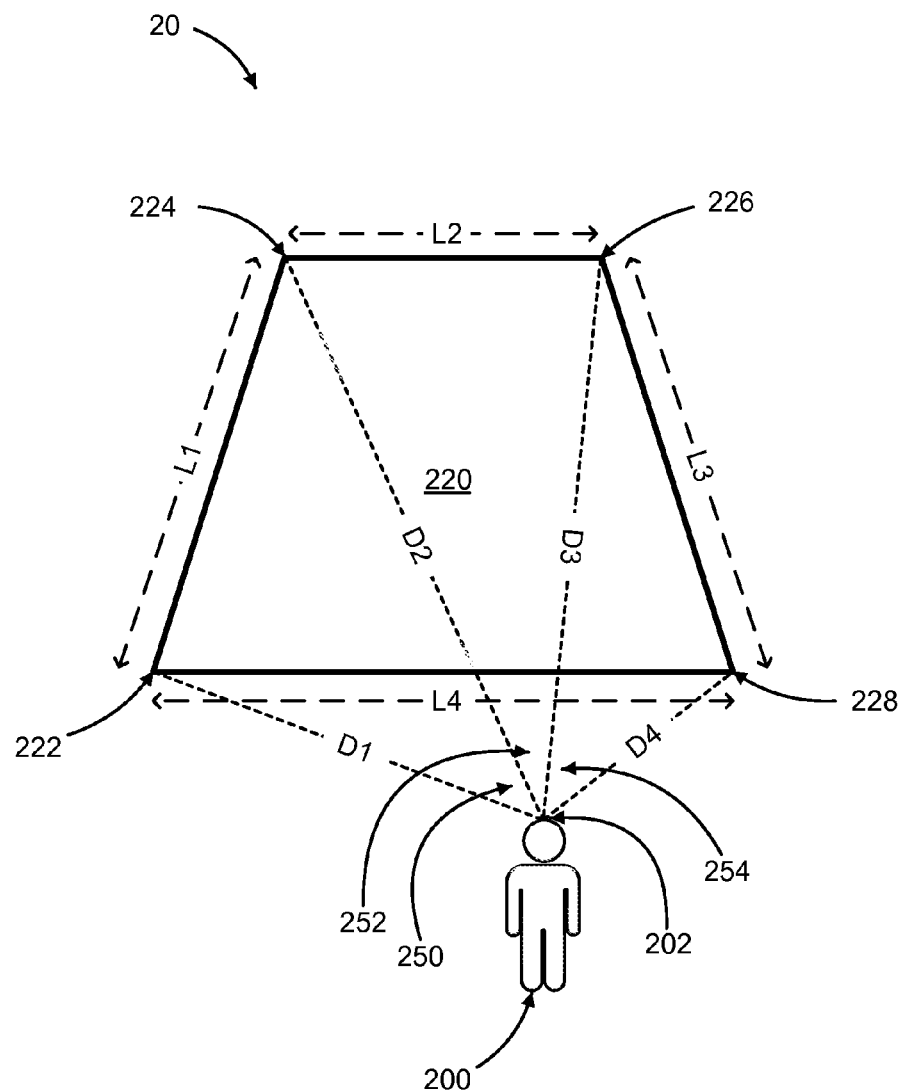
FIG. 2 illustrates measurement an area bounded by a plurality of line segments.

FIG. 2 illustrates an exemplary scenario 20 for measuring an area of a multi-sided planar object or space 220. The object in this example is in the shape of a trapezium, but may be of an arbitrary nature for the present purposes. For example the shape may be a square, rectangle, triangle, pentagon, octagon, or other regular or irregular multi-sided object.

A user 200 having a point of reference 202 wishes to establish the area of the object 220. The user employs the measuring apparatus of the present invention to measure the distances D1, D2, D3 and D4 from his or her reference point 202 to each of the vertices 222, 224, 226 and 228 respectively.

In addition, the present measuring apparatus and technique captures the planar angles 250, 252 and 254. Angle 250 is between vertices 222 and 224, angle 252 is between vertices 224 and 226 and angle 254 is between vertices 226 and 228.

A processor or computer in or coupled to the measuring apparatus will then use the measured distances D1, D2, D3 and D4 and the angles 250, 252 and 254 to compute the area of shape 220. In one embodiment, geometric relations of the triangles defined by the measured distances and angles are used to compute the area of shape 220. Specifically, in an exemplary embodiment, the area of object 220, "A220," is determined to be the sum of the areas of the triangles defined by the following triads of vertices:

$$A220 = A(202,222,224) + A(202,224,226) + A(202,226, 228) - A(202,222,228).$$

The measuring apparatus may be placed in the same plane as the planar object to be measured 220, in which the angles are measured in that same plane only. The coordinates of points 222, 224, 226, 228 are calculated and used with the formula for polygon area to calculate the area enclosed by the shape 220. In this generalized method, the measurement point of the user 200 may be in another plane than the shape 220. Examples of a methods for computing such geometric quantities may be found in the art. See for example Beyer, W. H. (Ed.). *CRC Standard Mathematical Tables*. 28*th ed*. Boca Raton, Fla.: CRC Press, pp. 123-124, 1987, and Weisstein, Eric C. "Polygon Area," MathWorld, A Wolfram Resource (http://mathworld.wolfram.com/PolygonArea.html), which are incorporated herein by reference. Such methods and formulae may be encoded into machine readable instructions and loaded into memory devices for execution on a processor in the measuring apparatus.

Alternatively, as will be described below for volumetric measurements, the angles are measured in more than one plane or dimension. This would be the case if a user holds the device for measurement of the area of a wall facing the user and the user is not in the plane of the wall being measured. Or similarly, if a user is holding the device and standing on/above a floor of a room, the area of which is to be measured, and therefore the user and the measuring apparatus are not in the plane of the floor being measured. In either case, two (or three) dimensional geometric principles allow the proper measurement of the desired area.

Figure 3:
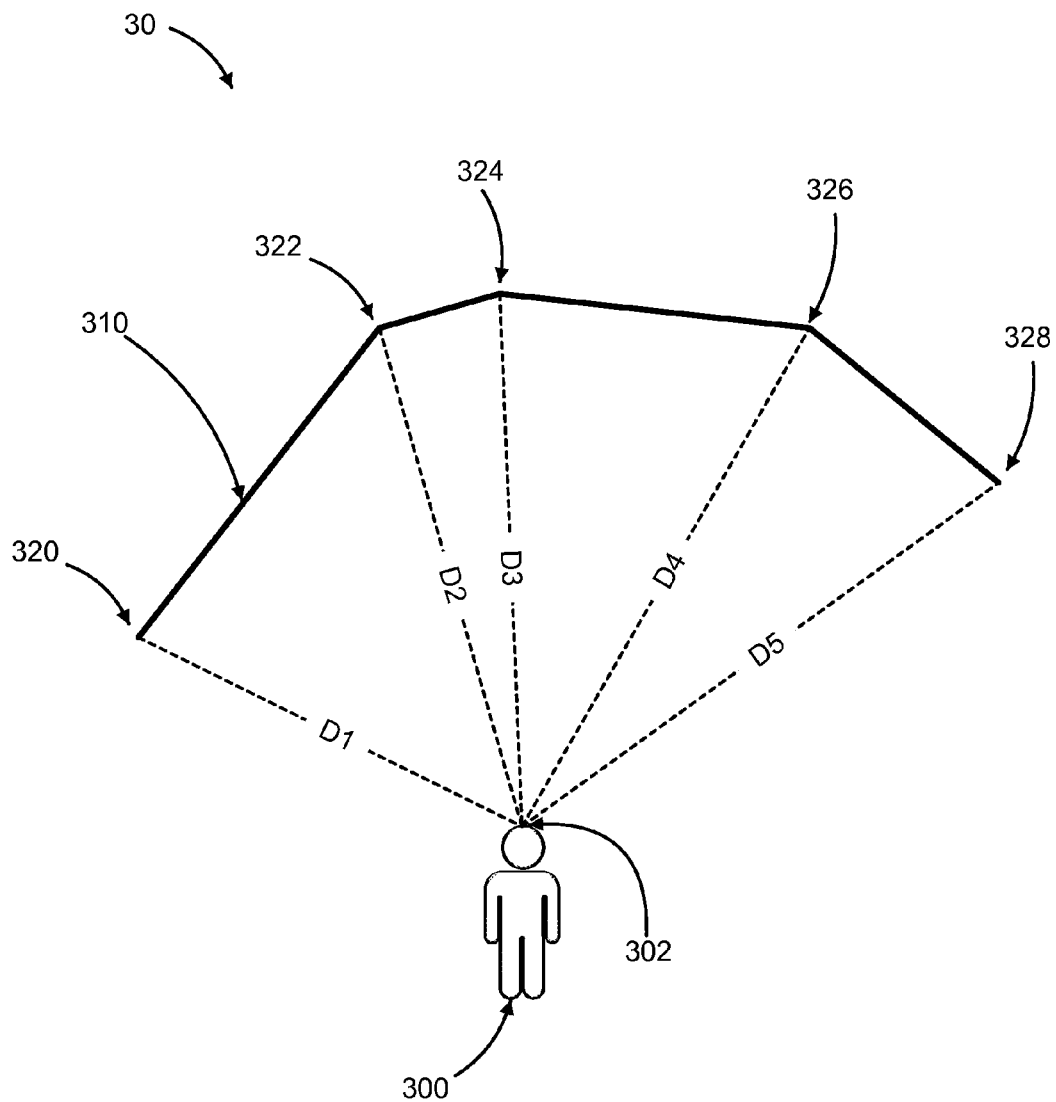
FIG. 3 illustrates measurement of a path comprising a plurality of line segments.

FIG. 3 illustrates a scenario 30 for measuring a sum of linear line segments 310, where the path along these segments from a starting point 320 to an ending point 328 is not determined by the shortest Euclidean distance (straight line) between points 320 and 328. Instead, the length of the desired path is determined by the sum of the line segments connecting the pairs: (320,322)+(322,324)+(324,326)+(326,328). These line segment lengths 310 can be individually determined as described above by measuring the distances D1, D2, D3, D4 and D5 to the respective inflection points 320, 322, 324, 326 and 328.

Therefore, the segmented path connecting points 320, 322, 324, 326, 328 can be measured by the present measuring apparatus by pointing the laser beam shone from the apparatus at each of the above points, then actuating or pressing an actuator to record the respective distance D1, D2, D3, D4, D5 and angles there between to the device's memory. The geometric relations and angles measured are used to compute the lengths of the discrete line segments, and the sum of the lengths of the line segments would be the total linear distance from point 320 to point 328 along the contour of the shape. As a specific illustrative example, the line segments may delineate a path along which an electrical extension or power cable is to be laid, or a shape of a room in a house, or the contour of a wall in a landscaping environment.

Figure 4:
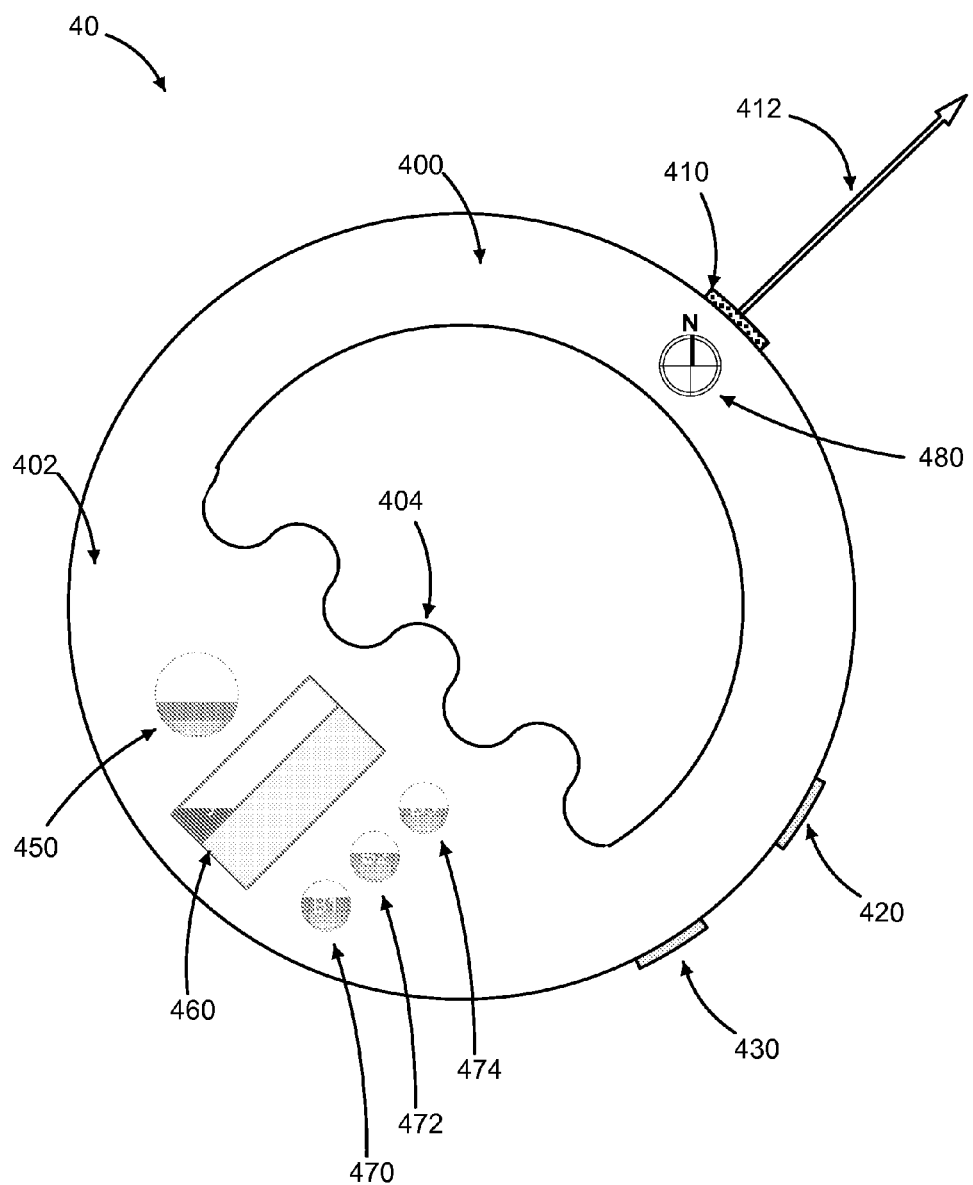
FIG. 4 illustrates an exemplary construction and user interface elements of a measurement apparatus.

FIG. 4 illustrates an exemplary embodiment of a measuring device according to the present disclosure. In this example, the measuring apparatus 40 has a generally circular body having a first portion 400 that houses a laser source assembly 410 from which a visible laser beam 412 is emitted. The apparatus also has a portion 402 which the user can hold in his or her hand. The portion 402 may be provided with an ergonomic grip portion 404 to allow secure holding of the apparatus. This makes it easy for the user to direct and point the device at a desired point.

The apparatus 40 may also be provided with a plurality of user interface and control components. For example, an ON/OFF switch or button 450 is used to turn the apparatus on and/or off. In some embodiments the apparatus is both hand-held and battery-powered, so it is useful to have a manual power switch. Also, the apparatus may automatically power down after a set period of non-use to conserve battery power. Other buttons 470, 472 and 474 provide features B1, B2 and B3 respectively as is discussed elsewhere in this disclosure relating to the use and operation of the apparatus.

Also, a digital display screen 460 may be provided for showing basic status and measurement information. The display and the other user interface elements may be used to select a MODE of operation of the apparatus. For example, to select a linear measurement mode (A-to-B), or area mode, volume mode, etc. The measured distances or angles may be shown on the digital display 460 and recorded in a memory device in the apparatus.

In some embodiments, the apparatus 40 contains one or more rechargeable DC power cells or batteries. These may be charged from a charging plug or terminal 420. The batteries may be rechargeable by connecting a power cord supplied with the apparatus to an AC power source, or the batteries may be recharged by connecting the apparatus to a universal serial bus (USB) or other standard connection that can provide power to charge the rechargeable batteries.

A data connector 430 is provided for uploading or downloading data to the apparatus. In some embodiments, the apparatus can download measurements taken in the field onto a computer so that the data can be stored on the computer or sent from the computer to other destinations as needed. The data downloaded to the computer may be used to compute further parameters from the measurements, to perform pricing tasks, or to assist designers or architects in their jobs.

Various embodiments for operating the measuring apparatus 40 are possible. In some embodiments, a button or switch such as those shown in FIG. 3 may be used to capture a distance measurement. The button or switch may be momentarily pressed to affect the measurement to the point at which laser beam 412 is pointed, or it may be depressed and held to show the distance to the indicated point in display screen 460.

As mentioned earlier, it is useful to be able to rotate the measuring apparatus, or to swivel it, so that its laser beam 412 swings between one point of interest and another, for example in indicating a first and second point on a line segment. To do this while keeping the apparatus 40 relatively stationary in space so that the laser source 410 does not translate, a pivot point 480 may be provided. Pivot point 480 can have several mechanical embodiments, each of which permit rotation with minimal or no translation of the laser source.

In a first embodiment, the apparatus 40 is mounted to a tripod or monopod that allows rotation of the apparatus 40 about one or more axes of pivot point 480. In a second embodiment, the apparatus 40 is provided with or includes a universal ball joint or bearing on which it can pivot, and the pivot point can rest on a support structure that can be set upon or rest on or fixed to a surface such as a counter top, the hood of a truck, a landscaping wall, a window sill, framing member, or the like. As would be appreciated, mechanical fixing methods such as suction cups, magnetic base elements, hook-and-loop tape, straps, elastic bands and other elements can be used to securely mount the apparatus to a convenient stationary member during measurement. A mini-tripod (tripod with short folding legs) and a ball joint is one example of a support and pivot structure that can be used herewith.

Figure 5:
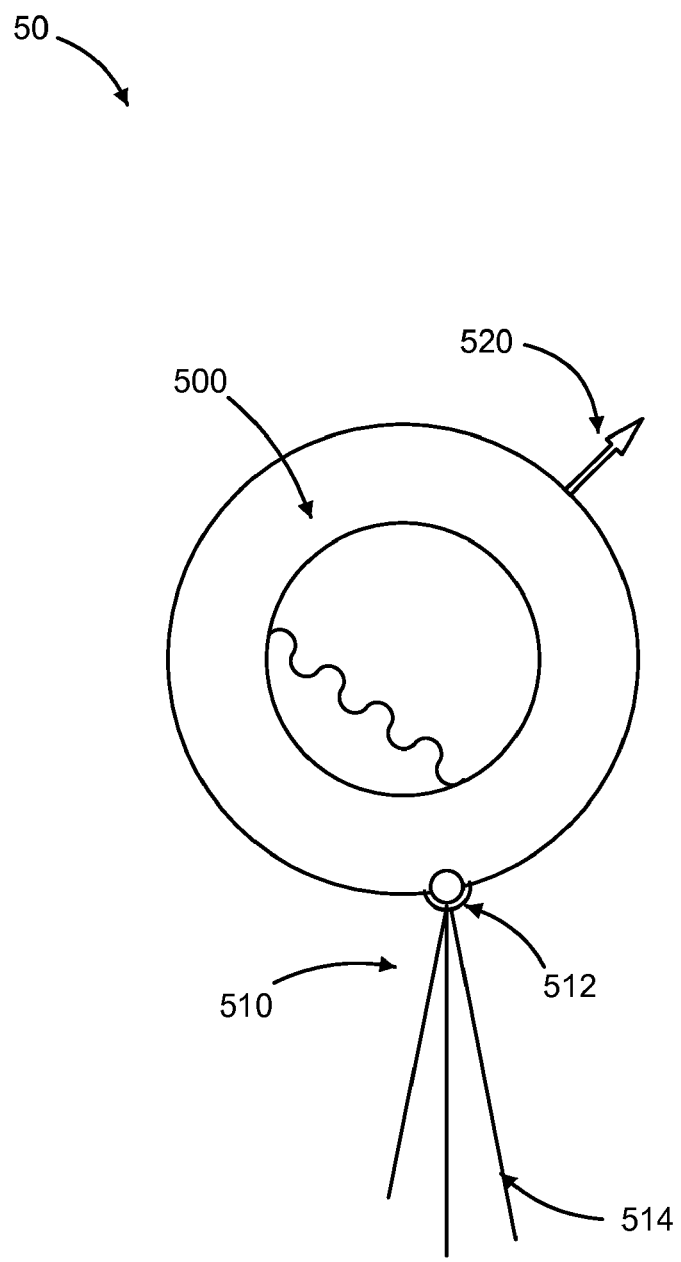
FIG. 5 illustrates an exemplary pivot support for rotating the measurement apparatus about one or more axes.

FIG. 5 illustrates one example of a miniature tripod support 510 that can be fixed to measuring apparatus 50 at a suitable point on the body 500 of the apparatus. A swiveling ball joint 512 allows pointing the laser beam 520 at a plurality of possible (sometimes infinitely adjustable) target spots. Three legs 514 support the apparatus, which can be placed onto a rigid or stable surface.

In some embodiments, a sensor or encoder such as an angular-position sensor is used to encode the absolute or relative angular position of the apparatus. This encoded position is then used to determine the angles between certain points of interest in one or more dimensions such as elevation and azimuthal positions.

Some or all of the present measuring apparatus embodiments may include a digital storage device or be adapted to coupling to a memory device so that the measurements and/or results of computed information can be stored onto the memory device for transfer to another machine or computer.

Additionally, some embodiments hereof allow the measuring device to send and/or receive information over a network, e.g., a wireless network such as a WiFi (IEEE 802.11) network, Bluetooth® (802.15) network, Ethernet, cellular, or other network.

The network exchange permits a user of the measuring device to receive information and to send measurements and calculation results to other persons or machines. In a specific embodiment, the measuring apparatus would store measured results for downloading to a computer where designers or architects or contractors can compute material needs or pricing. In addition, where equipped with pricing information, or where pricing information can be made available to the measuring device through communication with other things, the measuring apparatus itself can display in real-time the material needs or pricing associate therewith.

Take for example the case where the area 220 of FIG. 2 represents a room in a building under construction or renovation. A carpenter can determine the baseboard lengths needed by measuring the lengths L1 through L4 of the sides of the perimeter of the room 220. The carpenter can store this information for recall upon reaching the lumber supplier. Or, the carpenter can relay the measurements to his or her office for another staff member to order the materials. Alternatively, the carpenter can calculate, using pricing information, the cost of the baseboard materials and quote those to the home owner on the spot.

In another example, a wall-to-wall carpet installer may use the present system and method for determining a surface area 220 so that an amount of carpet or other flooring material can be ordered and pricing for the same calculated. Similarly, a painter may determine the area of one or more walls (if more than one wall is to be painted the areas of the individual walls may be stored and added together by the apparatus) and a price quote for the required paint and labor may be determined accordingly.

It should be apparent that three-dimensional variations of the present embodiments can also be made for volumetric calculations and measurements. For example, an air conditioning technician may need to determine the volume of a room or a space to ascertain the size and rating of the required air conditioning unit for the space. The technician would then employ the present measurement apparatus for measuring the distances to various vertex and corner points of the space, and measuring the angles there between. In this example, angles in more than one dimension are measured (e.g., azimuthal and elevation angles in three dimensions).

The present apparatus may make angular measurements in a number of ways. In one example, the angles are made by gyroscopic inputs to an angular position sensor. In other embodiments, a magnetic or compass-based angular position sensor may be employed. In yet other embodiments an optical or image-based sensor may be used to determine the angular position or displacement of the apparatus. Accelerometers and micro electro-mechanical sensors (MEMS) can be used to determine the rotation angle by which the measuring apparatus rotates between measurements of the points of interest. A suitable mechanical pivot, axis system, or other rotational bearing or joint can be used to rotate the measuring apparatus between measurements. For example, by moving the apparatus about a universal ball joint the user may point the measuring apparatus at a first point, take a first distance measurement to the first point, then rotate the apparatus to point at a second point, then take a second measurement to the second point, and so on. At each point of interest the user may tighten or lock down the apparatus to prevent unwanted movement thereof during the distance measurement. The apparatus may be equipped with a digital display that provides a readout to its user of the angle between the present position and an earlier position.

Like the earlier examples, the three-dimensional measurements may be made using a laser-based time of flight or interferometer measurement apparatus adapted as discussed herein to make and store the distances and/or angles to make the needed distance computations. A graphical display may provide a readout to the user of the apparatus indicating the distance to the point of interest at which the apparatus is pointing at any given time. The readout may update only upon actuating an actuator (e.g., pressing a button) or it may be continually updated or updated several times per second when the apparatus is powered on.

As alluded to above, the measurement apparatus may be equipped with a user interface (e.g., screen display, input/output (I/O) buttons or switches so that a user may press such a button or switch or other actuator to indicate that a measurement point is to be collected. In some embodiments, a visible laser beam is emitted so that the user can see the point to which the device will measure the distance. Once the laser beam, which shines a visible spot onto the point of interest, is in place, the user may actuate an actuator (e.g., press a button) and the apparatus will measure the distance from the apparatus to the spot onto which the laser light is shining.

Figure 6:
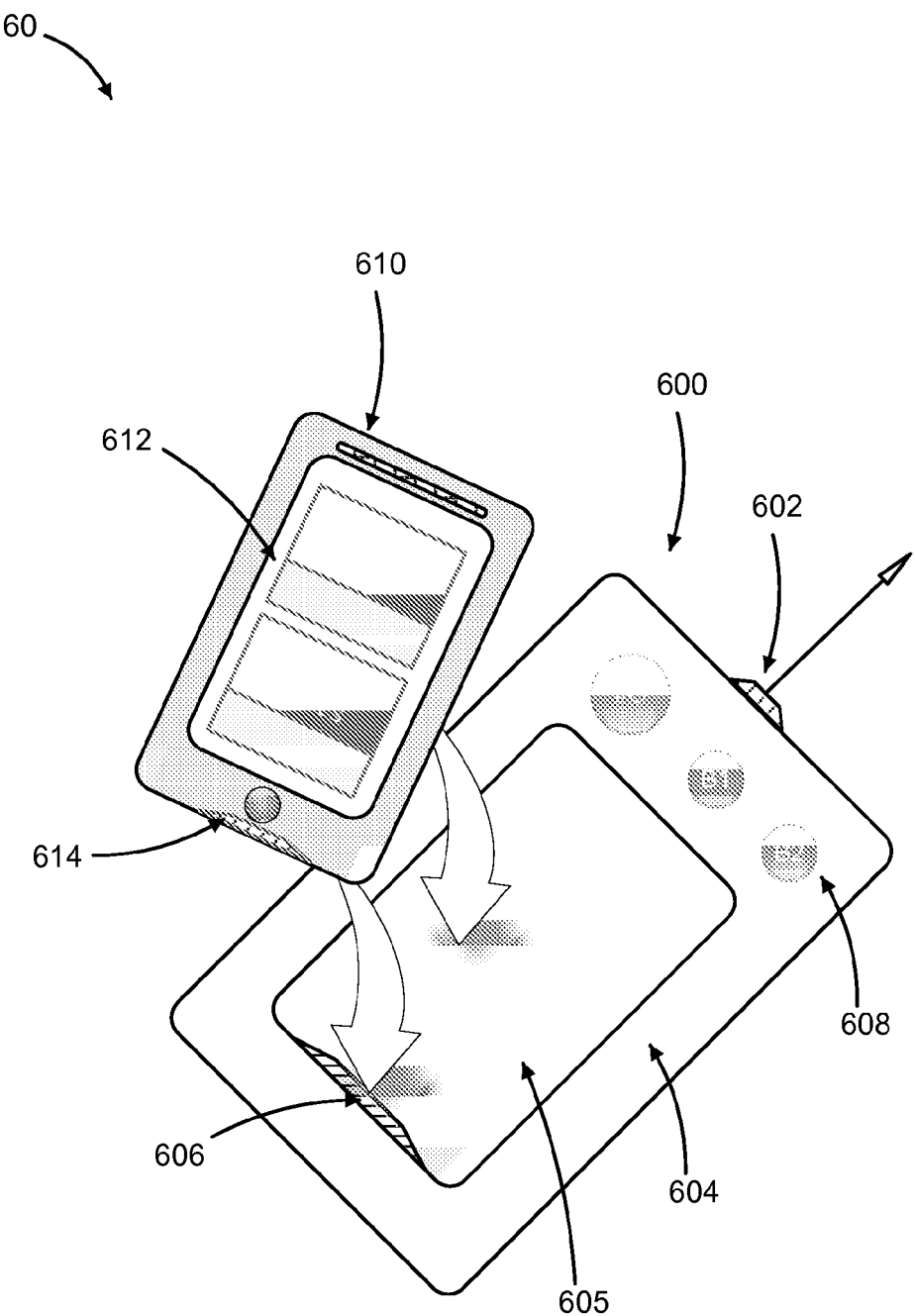
FIG. 6 illustrates a system that incorporates a personal electronic device with a user interface.

FIG. 6 illustrates a system 60 that measures dimensions as described above, and which uses a personal electronic device to provide a user interface and other functionality to the system.

The system includes a base unit 600 comprising a housing 604 and a recessed portion or opening 605 in said housing 604 designed to accommodate a hand-held personal electronic device 610. The personal electronic device 610 may be a cellular phone or personal digital assistant, and may be for example a commonly-available mobile product such as an iPhone® by Apple Computer Inc. of Cupertino, Calif., USA, or other available mobile and portable unit having a processor and a display for displaying a user interface 612. The display and user interface 612 of mobile device 610 may be used to provide visual and/or audible output to a user of the system 60 and to take input from the user, such as can be done using a touch screen. Mobile device 610 may be equipped with its own battery, software, instructions, or the like executing on a processor device thereon or a processor coupled to mobile device 610. Base unit 600 may include a battery separate from that of mobile device 610, but either the base unit 600 and/or mobile device 610 may include a battery able to provide the other component with power during operation.

Mobile device 610 and/or base unit 600 may include one or more digital storage locations or memory devices for holding instructions and data. Data collected as a result of the measurements made can be stored on a memory on board mobile device 610 for later use. In some embodiments, mobile device 610 can be connected (wirelessly or with a connector cable) to another computing device, and the measured and stored data may be transferred to that other computing device.

In some embodiments, the display screen for user interface 612 may be used to display results of certain measurements once they are made. In other embodiments, the user interface screen 612 is used to allow the user to select and enter information. In yet other embodiments, the user interface screen 612 is used to display a graphical picture of the objects measured, for example to display a shape of a perimeter or an area or a volume.

In all, coupling the base unit 600 with a mobile device 610 can allow for convenient collection and storage of information onto the mobile device 610 for later coupling to another computing device or to a network that retrieves the stored information from the mobile device 610.

In some embodiments, once the mobile device 610 is docked within and coupled to the storage or docking portion 605 of base unit 600 the two coupled units may share signals, electrical power, and the control actuators or buttons on one unit may be used to control or influence the other. For example, a hardware button 608 on the base unit may be used to cause the mobile device to capture a measurement value, or a control feature on the touch screen of the mobile device may cause the base unit to take a measurement by activating laser source 602 and determining a distance to a point in space therefrom. The signals can pass between the dock or base unit 600 and the mobile device 610 by way of the electrical interface pair 606-614, which may be a male-female set of pin or pad connectors adapted for mating to one another during docking operation.

As mentioned earlier, the entire apparatus may also be secured to a mounting or swiveling support unit for holding it still during measurements except for swiveling the apparatus to point at successive points of interest.

Additionally, a compact camera may be built into the apparatus in some embodiments so that a user can optionally take a photograph of the scene in which the distance measurement is being taken for each distance measurement. The captured images can be stored on the apparatus or can be downloaded to a computer for archiving or later review.

The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure. The claims are intended to cover such modifications and equivalents.

What is claimed is:

1. An apparatus for measuring a linear distance between two points of interest, comprising:
   a housing that allows gripping of the apparatus by a human user allowing transport thereof, and capable of rotation substantially without translation so as to point towards at least a first spatial point of interest and then towards a second spatial point of interest;
   a coherent visible light source, substantially housed within said housing, said light source adapted and arranged to provide an output comprising a coherent light beam to illuminate a spot at which said apparatus is pointed;
   an actuator, substantially disposed on said housing, said actuator adapted and arranged to receive an actuation input from a human user and to mark at least said first and second spatial points of interest when said apparatus is pointed towards said first and second spatial points of interest, respectively;
   a scanner to automatically scan the output of said coherent visible light source so that it illuminates a plurality of spots along a straight line between said first and second spatial points of interest to provide said user a visual indication of a linear path between said first and second spatial points of interest;
   a non-contacting sensor that measures linear distances form the apparatus to each of the spatial points of interest; and
   a processor that receives and processes signals from said sensor indicative of a respective distance to at least said first and second spatial points of interest, and that computes a linear distance between said first and second spatial points of interest along said linear path between said first and second spatial points of interest.

2. The apparatus of claim 1, further comprising an output indicator, that receives signals from said processor and provides an indication to said user of said geometric quantity derived from said measured distances.

3. The apparatus of claim 1, further comprising a portable DC power supply incorporated within said housing.

4. The apparatus of claim 1, further comprising a data port for coupling said apparatus to an external machine capable of uploading or downloading data from or to said apparatus.

5. The apparatus of claim 1, said housing further comprising a hand grip formed for convenient gripping by a human hand.

6. The apparatus of claim 1, said processor adapted and arranged to receive a plurality of signals indicative of a plurality of distances to a plurality of respective spatial points of interest, and said processor adapted and arranged to determine a path length sum of said plurality of distances.

7. The apparatus of claim 1, said processor adapted and arranged to receive a plurality of signals indicative of a plurality of distances to a plurality of respective spatial points of interest, and said processor adapted and arranged to determine an area of a planar geometry defined by said plurality of spatial points of interest using said plurality of distances.

8. The apparatus of claim 1, further comprising a sensor and a timer coupled to said coherent light source to determine a distance between said apparatus and a spatial point of interest towards which said apparatus is pointed using a time-of-flight calculation.

9. The apparatus of claim 8, further comprising an ultrasonic pulse-echo device that produces an acoustic pulse and senses a returned echo of said pulse and further determines a distance to a spatial point that caused said returned echo.

10. The apparatus of claim 1, further comprising an interferometer that determines a distance between said apparatus and a spatial point of interest towards which a beam of light is delivered.

11. The apparatus of claim 1, further comprising an orientation sensor for sensing a direction in which the apparatus is pointed.

12. The apparatus of claim 11, said sensor comprising a micro electro mechanical sensor (MEMS) device.

13. The apparatus of claim 11, said sensor comprising a gyroscopic device.

14. The apparatus of claim 11, said sensor comprising an accelerometer.

15. The apparatus of claim 1, said scanner comprising a rotating mirror that scans the coherent light beam in a plurality of directions from said light source to a corresponding plurality of spots along said straight line.

16. The apparatus of claim 1, said scanner comprising a rotating prism that scans the coherent light beam in a plurality of directions from said light source to a corresponding plurality of spots along said straight line.

17. The apparatus of claim 1, said scanner comprising a mechanical mover for moving said light source to emit said coherent beam therefrom in a plurality of directions from said light source to a corresponding plurality of spots along said straight line.

18. The apparatus of claim 1, further comprising a swiveling support member coupled to said housing that supports the apparatus and allows rotation of said apparatus for pointing at said spatial points of interest substantially without translation of the apparatus.

19. The apparatus of claim 18, said swiveling support member comprising at least one leg on which to stand and a joint permitting swiveling of said apparatus on said at least one leg in at least one degree of freedom.

20. The apparatus of claim 18, said swiveling support member coupled to an encoder that encodes an amount of angular rotation and provides a signal indicative of said amount of angular rotation.

21. The apparatus of claim 1, further comprising a portion of said housing formed so as to couple said apparatus with another mobile electronic device such as a mobile communication device, allowing for mechanical coupling of said apparatus and said mobile device by said portion of said housing and allowing for electrical coupling of said apparatus and said mobile device by way of an electrical connector.

22. The apparatus of claim 21, said electrical connector comprising a series of electrical connection points thereon built into said housing of said apparatus and constructed and placed to mate with a corresponding electrical connector comprising a corresponding series of electrical connection points of said mobile device.

23. A compact, portable apparatus for measurement and indication of physical dimension, comprising:
   a housing that allows gripping of the apparatus by a human user allowing transport thereof and capable of orientation to point towards one of a plurality of spatial points of interest;
   a swiveling support, mechanically coupled to said housing, allowing rotation of said apparatus so that it may be pointed towards a plurality of spatial points of interest without substantially translating said apparatus from a given location;
   a coherent visible light source, substantially housed within said housing, said light source adapted and arranged to provide a respective coherent visible beam from said apparatus to each of said plurality of spatial points of interest at which the apparatus is pointed;

an actuator, substantially disposed on said housing, said actuator adapted and arranged to receive an actuation input from a human user and to mark a respective distance from said apparatus to each of said plurality of spatial points of interest;

a processor that allows capture and processing of signals indicative of the respective measured distances to said plurality of spatial points of interest, and which allows computation of a geometric quantity derived from said measured distances; and a docking port for coupling said apparatus to a mobile electronic device so that the apparatus and the mobile device can exchange electrical signals through an electrical connector in said docking port.

24. The apparatus of claim 23, said docking port being substantially formed in said housing so as to receive a body of said mobile device therein.

25. The apparatus of claim 24, said docking port being formed and arranged to receive the body of a cellular communication mobile device and said apparatus being adapted to use a user interface input/output feature of said mobile device in operation of said apparatus.

26. The apparatus of claim 23, further comprising an indicator, that receives signals from said processor and provides an indication to said user of said geometric quantity derived from said measured distances.

27. A method for computing a geometric quantity from a plurality of distance measurements, comprising:

pointing a portable measurement apparatus towards a first spatial point of interest;

delivering a coherent light beam from said measurement apparatus to said first spatial point of interest;

measuring a first distance from said apparatus to said first spatial point of interest;

generating a first data signal indicative of said first distance;

without substantially translating said measuring apparatus, rotating the measurement apparatus so as to point it towards a second spatial point of interest;

delivering a coherent light beam from said measurement apparatus to said second spatial point of interest;

measuring a second distance from said apparatus to said second spatial point of interest;

generating a second data signal indicative of said second distance;

determining an angular rotation quantity between said first and second spatial points of interest; and processing said first and second data signals and said angular rotation quantity and providing an output indicative of a geometric quantity defined by respective positions of said first and second spatial points of interest.

28. The method of claim 27, further comprising, without substantially translating said measuring apparatus, rotating the measurement apparatus so as to point it towards a third spatial point of interest;

delivering a coherent light beam from said measurement apparatus to said third spatial point of interest;

measuring a third distance from said apparatus to said third spatial point of interest;

generating a third data signal indicative of said third distance; and determining a geometric quantity defined by at least said first, second and third distances.

29. The method of claim 27, further comprising coupling said measurement apparatus to a network and transmitting measured or computed geometric quantities across said network.

30. The method of claim 27, further comprising combining said geometric quantity with a pricing data to provide a price output indicative of a price of work to be done on an object associated with said geometric quantity.

31. The method of claim 27, further comprising measuring a third distance to a third spatial point of interest and any angular rotation between said third spatial point of interest and an earlier-measured spatial point of interest, and summing the respective distances between said first and second spatial points of interest and between said second and third spatial points of interest to derive a total path length from said first to said third spatial points of interest, passing through said second spatial point of interest, where said path is not necessarily in a straight line configuration.

32. The method of claim 31, further comprising measuring a plurality of other distances to other spatial points of interest lying along an arbitrary path so that the total length of said arbitrary path can be determined.

* * * * *